(12) United States Patent
Krick et al.

(10) Patent No.: US 12,733,080 B2
(45) Date of Patent: Sep. 8, 2026

(54) MATRIX LIGHT SOURCE FOR A MOTOR VEHICLE

(71) Applicant: VALEO VISION, Bobigny (FR)

(72) Inventors: Sebastian Krick, Bobigny (FR); Samuel Daroussin, Bobigny (FR)

(73) Assignee: Valeo Vision, Bobigny (FR)

( * ) Notice: Subject to any disclaimer, the term of this patent is extended or adjusted under 35 U.S.C. 154(b) by 40 days.

(21) Appl. No.: 18/700,788

(22) PCT Filed: Oct. 13, 2022

(86) PCT No.: PCT/EP2022/078596
§ 371 (c)(1),
(2) Date: Apr. 12, 2024

(87) PCT Pub. No.: WO2023/062173
PCT Pub. Date: Apr. 20, 2023

(65) Prior Publication Data

US 2025/0240860 A1 Jul. 24, 2025

(30) Foreign Application Priority Data

Oct. 15, 2021 (FR) ...................................... 2110955

(51) Int. Cl.
*H05B 45/10* (2020.01)
*B60Q 1/14* (2006.01)
(Continued)

(52) U.S. Cl.
CPC ......... *H05B 47/165* (2020.01); *B60Q 1/1415* (2013.01); *H05B 45/10* (2020.01);
(Continued)

(58) Field of Classification Search
CPC .... H05B 47/165; H05B 45/10; H05B 45/325; H05B 45/46; H05B 47/155; H05B 47/16; B60Q 1/1415; B60Q 2900/40
See application file for complete search history.

(56) References Cited

U.S. PATENT DOCUMENTS 5,027,112 A * 6/1991 Ross ...................... G09G 3/004
345/82
9,330,592 B2 5/2016 Xie
(Continued)

FOREIGN PATENT DOCUMENTS

DE 202012104959 U1 3/2014
WO 0146498 A2 6/2001
(Continued)

OTHER PUBLICATIONS

European Patent Office, International Search Report (including English translation) and Written Opinion for International Patent Application No. PCT/EP2022/078596, dated Feb. 8, 2023.
(Continued)

*Primary Examiner* — Minh Tran
(74) *Attorney, Agent, or Firm* — Valeo Vision

(57) ABSTRACT

The invention relates to a matrix light source having a plurality of elementary light sources with electroluminescent semiconductor elements, and a common substrate in contact with an integrated circuit. The integrated circuit is configured to delay the illumination of the elementary sources for a pre-determined duration following receipt of an illumination command.

15 Claims, 3 Drawing Sheets

(51) Int. Cl.

| | |
|---|---|
| ***H05B 45/325*** | (2020.01) |
| ***H05B 45/46*** | (2020.01) |
| ***H05B 47/155*** | (2020.01) |
| ***H05B 47/16*** | (2020.01) |
| ***H05B 47/165*** | (2020.01) |

(52) U.S. Cl.

CPC ........... *H05B 45/325* (2020.01); *H05B 45/46* (2020.01); *H05B 47/155* (2020.01); *H05B 47/16* (2020.01); *B60Q 2900/40* (2022.05)

(56) References Cited

U.S. PATENT DOCUMENTS

| | | | | |
|---|---|---|---|---|
| 11,081,070 | B2 | 8/2021 | Calayir et al. | |
| 2010/0176745 | A1* | 7/2010 | Keh .................. | H05B 45/3725 315/294 |
| 2020/0090608 | A1* | 3/2020 | Calayir .................. | H05B 45/32 |

FOREIGN PATENT DOCUMENTS

| | | | |
|---|---|---|---|
| WO | 2010072380 | A1 | 7/2010 |
| WO | 2020064886 | A1 | 4/2020 |

OTHER PUBLICATIONS

European Patent Office, Office Action (with Machine Translation) of corresponding European Application No. 22801486.6, dated May 11, 2026, 12 pages.

* cited by examiner

Fig. 5

MATRIX LIGHT SOURCE FOR A MOTOR VEHICLE

TECHNICAL FIELD

The invention relates to electroluminescent semiconductor element-based matrix light sources, notably for automotive vehicles. In particular, the invention relates to a matrix light source whose electrical consumption is not liable to exhibit electric current peaks.

BACKGROUND OF THE INVENTION

A light-emitting diode (LED) is a semiconductor electronic component capable of emitting light when an electric current flows therethrough. In the automotive field, LED technology is increasingly being used in various luminous signaling solutions. LEDs are used to provide luminous functions such as daytime running lights, signaling lights, etc. The luminous intensity emitted by an LED is generally dependent on the intensity of the electric current flowing therethrough. Inter alia, an LED is characterized by an electric current intensity threshold value. This maximum forward current generally decreases with increasing temperature. Likewise, when an LED emits light, a voltage drop equal to its forward voltage or nominal voltage is observed across its terminals.

The use of matrix arrays of LEDs comprising a high number of elementary electroluminescent light sources is beneficial in numerous fields of application, and notably also in the field of lighting and signaling for automotive vehicles. A matrix array of LEDs may be used for example to create light beam forms that are beneficial for luminous functions, such as high-beam lights or daytime running lights. In addition, a plurality of different luminous functions may be produced using a single matrix array, thus reducing the physical bulk in the restricted space of an automotive vehicle light.

As is known, matrix light sources or, equivalently, pixelated light sources are controlled by a control unit that is physically remote from and electrically connected to the light source. The elementary light sources or, equivalently, pixels that make up a matrix light source extend over very small dimensions, of the order of 50 to 200 μm each, and each of them consumes only a low-intensity current, of the order of 10 mA, when it is activated. However, when all of the elementary light sources of a matrix source have to be activated at the same time, an overall current peak of high intensity is consumed at the matrix light source: the electric current consumed by an elementary light source is multiplied by the number of pixels. For matrix sources with 256 pixels, a consumption peak of the order of 2.5 A may be observed. This value is obviously all the higher when the number of pixels and their individually consumed electric current increase. Such electric current peaks give rise to electromagnetic radiation that is liable to generate electromagnetic interference at other electronic components, the operation of which may thereby be degraded. This phenomenon is all the more critical in the field of light signaling for automotive vehicles, in which a plurality of electronic components are located in the restricted volume that is available to house the components of an automotive vehicle light.

SUMMARY OF THE INVENTION

The objective of the invention is to mitigate at least one of the problems with the prior art. More precisely, the objective of the invention is to propose a matrix light source or pixelated light source whose electric current consumption when its pixels are activated is reduced.

According to a first aspect of the invention, a matrix light source is proposed. The matrix light source comprises an integrated circuit and a matrix array of electroluminescent semiconductor element-based elementary light sources. The integrated circuit is in contact with the matrix array and comprises sequencing means for the activation of the elementary light sources, including, for each of the elementary light sources, a delay unit configured to delay the activation of the elementary source by a predetermined period.

The matrix light source is noteworthy in that the elementary light sources are grouped into a number G of separate groups of rows interlinked in such a way that each set of G rows which follow each other in the matrix array comprises a row belonging to each of the G groups of rows respectively.

The sequencing means are configured to sequentially activate the elementary light sources forming part of a given group of rows following the reception of an activation command, and to sequentially activate the groups of rows.

In other words, the elementary light sources of a same given group of rows are activated before the elementary light sources of another group of rows are activated.

The sequencing means may optionally be configured to sequentially activate the elementary light sources of a given row, column by column.

According to one exemplary embodiment, the sequencing means may comprise connections which functionally connect the delay unit of one elementary source to the delay unit of another elementary light source from the same group of rows, the arrangement being such that the delay for the second elementary light source starts to elapse only once the delay of the first elementary light source has elapsed.

The delay unit of each elementary light source may optionally comprise a trigger circuit for sending a trigger signal to the light source that is connected thereto, following the elapsing of its delay.

The delay unit of a last elementary light source of one group of rows may optionally be functionally connected to the delay unit of a first elementary light source of another group of rows, which follows the first group of rows in the activation sequence.

By way of example, the first elementary light source may comprise the elementary light source situated in the first column of the first row of a given group, according to the activation order of the rows of the group.

The last elementary light source may optionally comprise the elementary light source situated in the last column of the last row of a given group, according to the activation order of the rows of the group.

According to one exemplary embodiment, all of the elementary light sources are aligned with each other regardless of the group of rows to which they belong. Preferably, the elementary light sources are aligned with each other in the two dimensions along which the matrix light source extends. In other words, each elementary light source is aligned with its neighbor above and/or below in the same column and with its neighbor to the right and/or left in the same row.

The sequencing means may optionally comprise a sequencing unit which is functionally connected to at least each first elementary light source of each of the groups of rows. The sequencing unit may preferably be configured to selectively trigger the respective delay units of the first elementary light sources.

By way of example, the matrix array may comprise four groups of rows interlinked in such a way that each set of four rows which follow each other in the matrix array comprises a row belonging to each of the four groups of rows.

For example, the delay for each elementary light source may be identical and be between 5 ns and 1 μs.

The delay unit may comprise a memory element for recording a delay value.

By way of example, the activation signal comprises information regarding the characteristics of at least one luminous image, or photometric image, to be projected, for example regarding its shape, its size and/or regarding the intensity of the luminous flux of each pixel that makes up said image. A pixel of the luminous image may be formed from at least one elementary light source.

The luminous image may be a regulated photometric image of the high-beam light type or the low-beam light type for an automotive vehicle.

In the aforementioned example or in another exemplary embodiment, in order to project the luminous image, only the elementary light sources that participate in forming this image will be activated. The other elementary light sources remain switched off. In other words, to form certain examples of the luminous image, it is not necessary for all of the elementary light sources of the matrix light source to be activated. This means that, in a given group of rows, the sequential activation concerns the light sources participating in forming the luminous image.

In this case, the sequencing means comprise a sequencing unit functionally connected to the delay unit of each of the elementary light sources so as to be able to selectively trigger the respective delay units of the elementary light sources. In this way, the sequencing means can ignore the delay units of the elementary light sources that have to remain switched off and can directly trigger the delay units linked to the elementary sources that participate in forming the luminous image. This enables more efficient activation of the matrix light source.

According to another aspect of the invention, a luminous module for an automotive vehicle is proposed. The luminous module comprises at least one matrix light source and a circuit for driving the supply of electric power to said source, characterized in that the at least one matrix light source is in accordance with an aspect of the invention. Preferably, the luminous module comprises at least two matrix light sources in accordance with an aspect of the invention.

According to one exemplary embodiment, the circuit for driving the supply of electric power comprises switch devices, each switch device being associated with a corresponding elementary light source and being controlled by a corresponding delay unit. In other words, each elementary light source can be selectively connected to the power source and the activation of this source can be delayed by the associated delay unit.

According to one exemplary embodiment, the matrix array of elementary light sources may comprise a common substrate supporting the elementary light sources. The common substrate of the matrix array may preferably comprise SiC.

By way of example, the integrated circuit may comprise an Si substrate. The integrated circuit is preferably soldered or adhesively bonded to the matrix array of elementary light sources, for example to a common substrate supporting the elementary light sources. The integrated circuit is preferably soldered or adhesively bonded to the lower face of the common substrate, opposite the face that comprises the elementary light sources. For example, the integrated circuit is in mechanical contact, for example via fastening means, and in electrical contact with the common substrate, which has electrical connection areas on its lower face.

According to one exemplary embodiment, the delay units of the elementary light sources may be functionally connected in a sequential manner so as to form a chain. The delay units of the elementary light sources of each group of rows may preferably be functionally connected in a sequential manner so as to form a chain per group of rows.

The delay unit may comprise a delay line.

According to one exemplary embodiment, the delay lines associated with all of the elementary light sources may be clocked using the same clock signal.

According to one exemplary embodiment, the number G of rows is a parameter may be recorded and can be modified in a memory element readable by the sequencing means. G is an integer.

The pixelated light source, or, equivalently, the matrix light source, may preferably comprise at least one matrix array of electroluminescent elements—the elementary light sources—also called a monolithic array, which elements are arranged in at least two columns by at least two rows. The electroluminescent source preferably comprises at least one monolithic matrix array of electroluminescent elements, also called a monolithic matrix array.

In a monolithic matrix array, the electroluminescent elements are grown from a common substrate and are electrically connected so as to be able to be activated selectively, individually or by subset of electroluminescent elements. Each electroluminescent element or group of electroluminescent elements may thus form one of the elementary emitters of said pixelated light source that is able to emit light when its or their material is supplied with electricity. The manufacture of monolithic matrix arrays has been described in the prior art and does not form part of the subject matter of the present invention.

According to another aspect of the invention, a method for activating semiconductor element-based elementary light sources of a matrix light source is proposed. The method is noteworthy in that it comprises the following steps following the reception of a signal for activating the matrix light source:

- using the sequencing means and the delay units associated with the elementary light sources, sequentially activating the elementary light sources forming part of a given group of rows;
- sequentially activating the groups of rows;
- the elementary light sources of the matrix array being grouped into a number G of separate groups of rows interlinked in such a way that each set of G rows which follow each other in the matrix array comprises a row belonging to each of the G groups of rows respectively.

According to one exemplary embodiment, the method further comprises a step of receiving the matrix light source activation signal, said activation signal comprises information regarding the characteristics of at least one luminous image to be projected.

The method optionally comprises a step of identifying the elementary light sources that have to remain switched off and of identifying the first elementary light source to be activated. Specifically, the step of identifying the first elementary source to be activated consists in identifying the group of rows to which this first source belongs and the location of this first source within the identified group of rows.

Several strategies can be used to define which is the first elementary source to be activated. For example, the first elementary light source may be the elementary light source which is situated furthest up and furthest to the left from among the elementary sources that have to be activated to form the luminous image to be projected. In this case, the first elementary light source to be activated is not necessarily the elementary light source situated in the first column of the first row of the group.

Here, the terms “top”, “bottom”, “right”, “left” are defined with respect to the matrix light source in its state mounted in the luminous module.

Alternatively, the first elementary light source may be the source whose luminous flux intensity is the highest, or, by contrast, the lowest.

Using the measures proposed by the invention, it becomes possible to propose a matrix light source or pixelated light source whose electric current consumption when its pixels are activated is reduced. By delaying the activation potentially individually for each pixel, the invention is capable of smoothing, over time, the current intensity peak that appears in known solutions when the matrix light source is activated. By sequentially displaying interlinked sub-sets of rows of the matrix array, this effect is more pronounced and the maximum intensity of the inrush current is reduced. This smoothing of the electric current consumption results in a reduction in electromagnetic radiation, thus giving rise to a reduced risk of electromagnetic interference at other electronic components which are in physical proximity to the matrix light source. Since, however, the delays for each pixel are short, the effect of the delay is generally not visible or hardly visible. When several non-synchronized matrix light sources are adjacent, the risk of the appearance of flickering is reduced by the use of the light sources proposed in accordance with the invention, the variation as a function of time in the electric currents in the two sources having a more pronounced continuous component than in the known solutions.

BRIEF DESCRIPTION OF DRAWINGS

Other features and advantages of the present invention will be better understood on reading the description of the examples and drawings, in which:

FIG. 5 shows the variation as a function of time in the intensity of the electric current in a matrix light source in three activation scenarios.

DETAILED DESCRIPTION OF THE INVENTION

Unless specified otherwise, technical features described in detail with respect to a given embodiment may be combined with the technical features described in the context of other embodiments described by way of example and non-limitingly. Similar reference numbers will be used to describe similar concepts across various embodiments of the invention. For example, the references 100, 200 and 300 denote three embodiments of a matrix light source according to the invention.

The invention is based on the observation that, for a given image that is projected by a matrix light source, the intensity of the total inrush current of the matrix light source is reduced and smoothed not only by delaying the respective instant of activation of each elementary light source of the matrix light source but also by activating the rows of such a matrix array in an interlinked manner. The proposed matrix light source enables the implementation of such an interlinked and sequential activation method. In the case of a matrix light source used for the implementation of an automotive vehicle headlamp, the projected images are very specific, and generally comprise sharp, generally flat, intensity cutoffs. By first displaying the odd rows and then the even rows, peaks in luminous intensity and electric current can be smoothed over time. Row jumps of three or four rows per group may also be envisioned. By way of example, a high luminous intensity, and therefore the amplitude of a higher electric current which would affect rows 1 to 5 of a matrix light source but would not affect rows 6 to 9, is smoothed over time by following an activation sequence by three interlinked groups 1(strong)-4 (strong)-7(weak)-2 (strong)-5(strong)-8(weak)-3(strong)-6(weak)-9(weak), compared with a linearly varying activation of rows 1 to 10.

Figure 1:
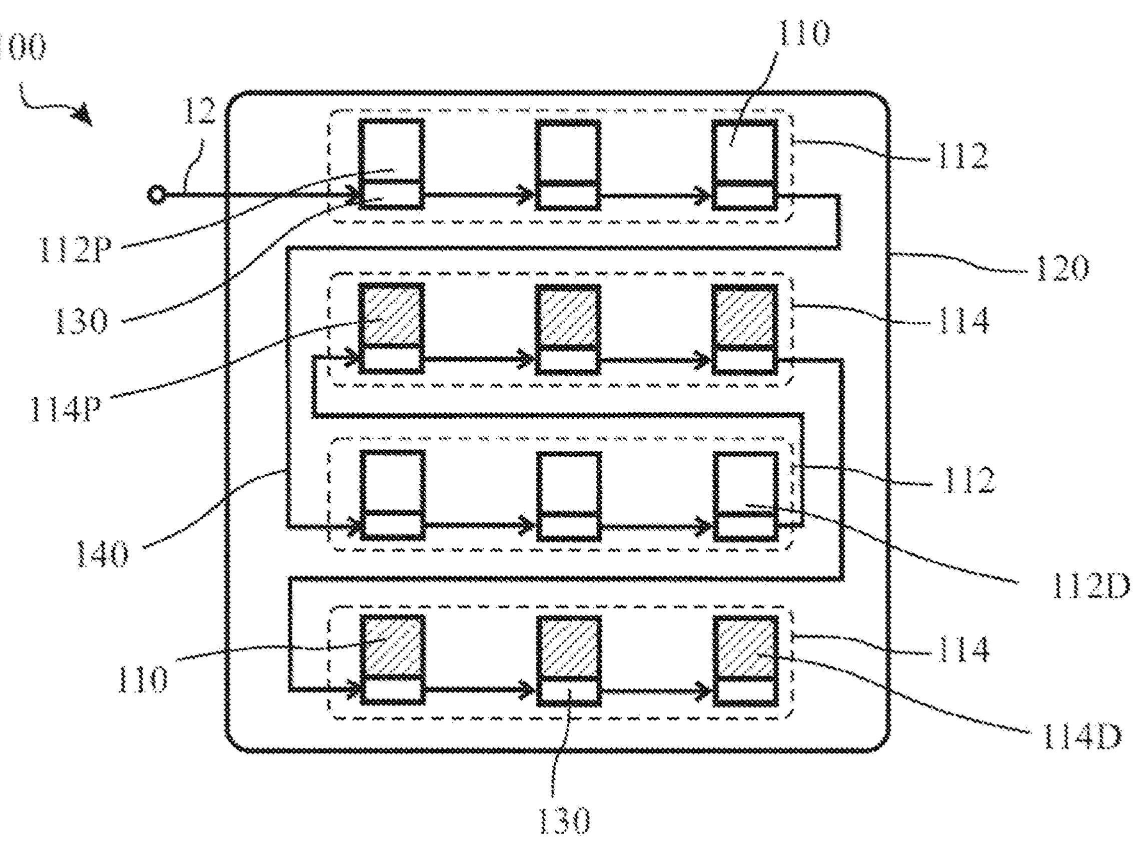
FIG. 1 schematically shows a matrix light source according to a preferred embodiment of the invention.

The illustration in FIG. 1 shows a pixelated light source or matrix light source 100 according to a preferred embodiment of the invention. The matrix light source 100 comprises a plurality of electroluminescent semiconductor element-based elementary light sources 110 and a common substrate in mechanical and electrical contact with and functionally connected to an integrated circuit 120. The elementary light sources are typically light-emitting diodes (LEDs).

The matrix light source 100 preferably comprises a monolithic matrix component in which the semiconductor layers of the elementary light sources 110 are, for example, disposed on the common substrate. The matrix array of elementary light sources 110 preferably comprises a parallel assembly of a plurality of branches, each branch comprising electroluminescent semiconductor light sources 110.

By way of example and non-limitingly, the matrix array of elementary light sources comprises, along the thickness of the substrate and starting at the end opposite the location of the elementary sources 110, a first electrically conductive layer deposited on an electrically insulating substrate. This is followed by an n-doped semiconductor layer whose thickness is between 0.1 and 2 μm. This thickness is much smaller than that of known light-emitting diodes, for which the corresponding layer has a thickness of the order of 1 to 2 μm. The following layer is the active quantum well layer having a thickness of around 30 nm, followed by an electron-blocking layer, and finally a p-doped semiconductor layer, the latter having a thickness of around 300 nm. Preferably, the first layer is an (Al)GaN:Si layer, the second layer is an n-GaN:Si layer, and the active layer comprises quantum wells made of InGaN alternating with barriers made of GaN. The blocking layer is preferably made of AlGaN:Mg and the p-doped layer is preferably made of p-GaN:Mg. n-Doped gallium nitride has a resistivity of 0.0005 ohm/cm, whereas p-doped gallium nitride has a resistivity of 1 ohm/cm. The thicknesses of the proposed layers make it possible notably to increase the internal series resistance of the elementary source, while at the same time significantly reducing its manufacturing time, since the n-doped layer is not as thick in comparison with known LEDs and requires a shorter deposition time. By way of example, a time of 5 hours is typically required for MOCVD depositions for a standard-configuration LED with 2μ of n layer, and this time may be reduced by 50% if the thickness of the n layer is reduced to 0.2μ.

In order to obtain elementary light sources 110 having semiconductor layers having homogeneous thicknesses, the monolithic component 100 is preferably manufactured by depositing the layers homogeneously and uniformly over at least part of the surface of the substrate so as to cover it. The layers are deposited for example using a metal oxide chemical vapor deposition (MOCVD) method. Such methods and reactors for implementing them are known for depositing semiconductor layers on a substrate, for example from patent documents WO 2010/072380 A1 or WO 01/46498 A1. Details on their implementation will therefore not be described in the context of the present invention. The layers thus formed are then pixelated. By way of example and non-limitingly, the layers are removed using known lithographic methods and by etching at the sites that subsequently correspond to the spaces between the elementary light sources 110 on the substrate. A plurality of several tens or hundreds or thousands of pixels 110 having an area smaller than one square millimeter for each individual pixel, and having a total area greater than 2 square millimeters, having semiconductor layers with homogeneous thicknesses, and therefore having homogeneous and high internal series resistances, are thus able to be produced on the substrate of a matrix light source 100. Generally speaking, the more the size of each LED pixel decreases, the more its series resistance increases, and the more this pixel is able to be driven by a voltage source. Alternatively, the substrate comprising the epitaxial layers covering at least part of the surface of the substrate is sawn or cut into elementary light sources, each of the elementary light sources having similar characteristics in terms of their internal series resistance.

The invention also relates to types of semiconductor element-based elementary light sources involving other configurations of semiconductor layers. Notably the substrates, the semiconductor materials of the layers, the arrangement of the layers, their thicknesses and any vias between the layers may be different from the example that has just been described.

The integrated circuit 120 is preferably soldered to the lower face of the common substrate, which houses the elementary light sources, so as to establish mechanical and electrical contact with the substrate and the elementary light sources. The integrated circuit further comprises, for at least one, but preferably for all of the elementary light sources 110, a delay unit 130 configured to delay the activation of the elementary light source by a predetermined period following the reception of an activation command 12, typically generated by a control unit external to the matrix light source 100. The delay unit 130 associated with each of the elementary light sources 110 is illustrated purely schematically in FIG. 1. The delay unit 130 is for example formed by an electronic circuit which forms a delay line. Such electronic circuits are well known in the art, and their operation will not be described in detail in the context of the present invention. The delay implemented for each of the elementary sources 110 preferably differs, in such a way that a control signal 12 intended at the same time for all of the elementary sources 110 of the matrix source 100 is subjected to a different delay for each elementary source, or at least for separate sets of elementary light sources. Since the activation of the elementary light sources is delayed potentially individually for each elementary light source, this makes it possible to avoid a single maximum peak in the electrical consumption of the matrix light source 100 when the control signal 12 takes effect.

Using an integrated circuit 120 in mechanical and electrical contact with the substrate on which the elementary light sources reside makes it possible to dispense with wired connections, the number of which would be at least equal to the number of pixels of the matrix light source.

The elementary light sources 110 are grouped into a number G of separate groups of rows interlinked in such a way that each set of G rows which follow each other in the matrix array comprises a row belonging to each of the G groups of rows respectively. G is an integer. In the non-limiting example in FIG. 1, G=2, the two groups of rows 112 and 114 being respectively indicated by non-hatched and hatched light sources. The integrated circuit 120 further comprises sequencing means configured to sequentially activate the elementary light sources which belong to a same given group of rows following the reception of an activation command, and to sequentially activate the groups of rows. The sequencing means 140 are therefore capable of implementing the activation sequence indicated by the arrows between the elementary light sources in FIG. 1, using the delay units 130. Following the reception of an activation command 12, the sequencing means 140 first activate the first elementary light source 112P of the first group of rows 112. Then, following ideally identical delays, each of the elementary light sources of the first row of the matrix array are activated, one after the other. After the first row of the matrix array, the sequencing means make it so that the third row of the first group of rows 112 (G=2) is followed. Once the last elementary light source 112D of the first group 112 has been activated, the sequencing means make it so that the first light source 114P of the second row of the matrix array is followed, corresponding to the first row of the second group of rows 114. The activation of the rows of the second group follows the same sequencing as that described for the first group of rows 112. It goes without saying that this principle extends to configurations having three, four or more interlinked groups of rows.

Figure 2:
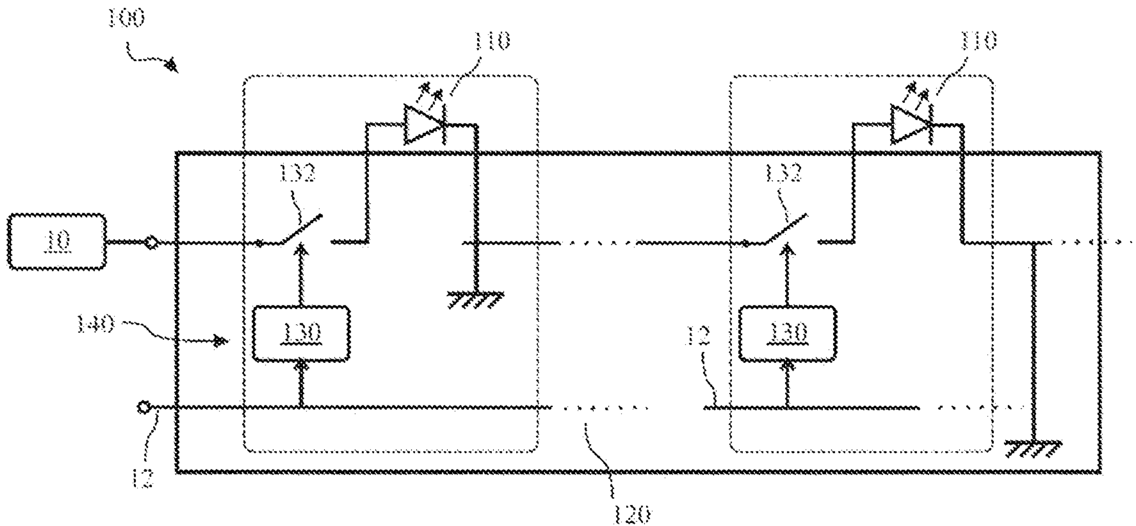
FIG. 2 schematically shows details of a matrix light source according to a preferred embodiment of the invention.

The illustration in FIG. 2 shows one exemplary embodiment which allows a sequencing between elementary light sources as has just been described. Depending on the matrix light source, it may be voltage-driven or current-driven by a circuit for driving the supply of electric power. Such circuits are known per se in the art, and their operation will not be described in detail in the context of the present invention. They involve at least one converter circuit capable of converting an input voltage/current, supplied for example by a voltage/current source internal to an automotive vehicle, such as a battery, into an output voltage/current, having an intensity suitable for supplying power to the matrix light source.

In one exemplary embodiment, it is possible to supply power to the elementary light sources by applying a pulse width modulation (PWM) signal having a duty cycle, a frequency and a peak current. By adjusting the frequency, duty cycle and peak current of the PWM signal, a predetermined average current intensity may be obtained at each elementary light source. The intensity of the luminous flux emitted by each elementary light source is generally proportional to the average intensity of the electric current flowing therethrough. Thus, the parameters of a PWM signal applied to each elementary light source define the intensity of the luminous flux thereof. In this example, on the basis of information relating to the intensity of the luminous flux of each pixel that makes up the luminous image to be projected by the matrix light source, the converter circuit is configured to convert this luminous flux information into parameters of the corresponding PWM signal to be applied to each elementary light source.

When the matrix light source is powered by an electricity source 10 and is voltage-driven, the driving of each elementary source, or, equivalently, of each pixel, merely entails controlling a switch device 132 as shown schematically in FIG. 2. By controlling the state of the device 132, the elementary light source 110 may be selectively connected to the voltage source 10. The switch device is for example formed by a field-effect transistor of the MOSFET type, preferably characterized by a low voltage drop between its drain and source terminals, and controlled by the control signal 12 delayed by the delay unit 130. The sequencing means 140 comprise the delay units 130 which can be pre-configured to implement the sequential sequencing by interlinked groups of rows, as has been described in the context of FIG. 1.

Preferably, not only the switch elements 132 but also a power supply circuit may be integrated into the substrate 120 when the monolithic component 100 is manufactured.

Figure 3:
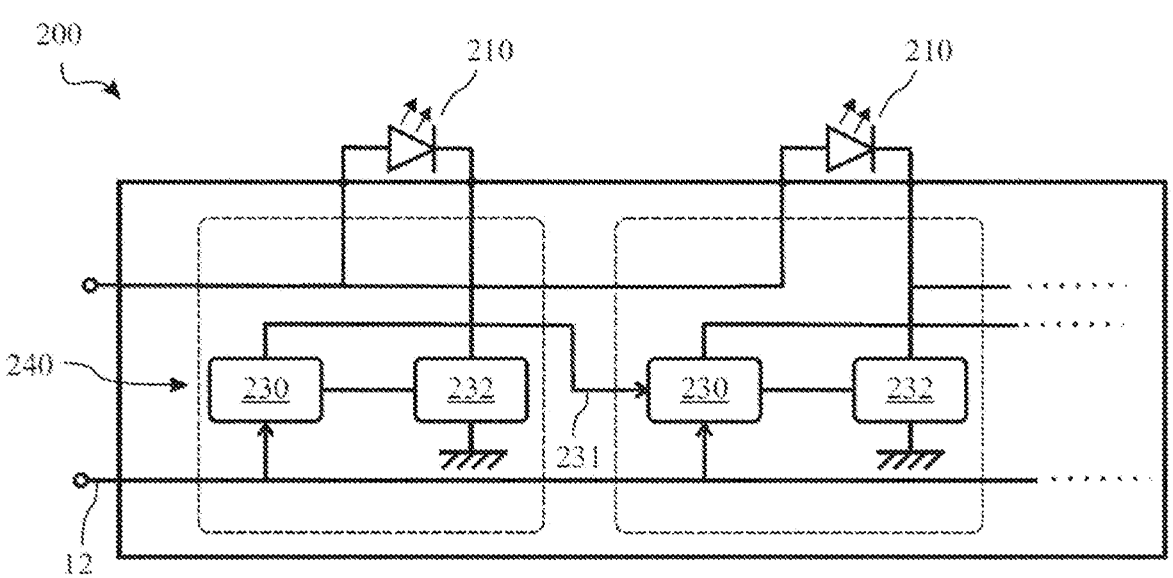
FIG. 3 schematically shows details of a matrix light source according to a preferred embodiment of the invention.

The illustration in FIG. 3 shows an alternative exemplary embodiment which allows a sequencing between elementary light sources as has been described in connection with FIG. 1. The illustration in FIG. 3 shows a pixelated light source or matrix light source 200 according to a preferred embodiment of the invention. The matrix light source 200 comprises a plurality of electroluminescent semiconductor element-based elementary light sources 210 grouped into an integer number of separate, interlinked groups of rows and a common substrate (not illustrated) in contact with and functionally connected to an integrated circuit 220. The elementary light sources are typically light-emitting diodes (LEDs).

The matrix light source 200 is preferably a monolithic component in which the semiconductor layers of the elementary light sources 210 are disposed on the common substrate. The matrix light source 200 preferably comprises a parallel assembly of a plurality of branches, each branch comprising electroluminescent semiconductor light sources 210.

The integrated circuit 220 further comprises, for at least one, but preferably for all of the elementary light sources 210, a delay unit 230 that forms part of the sequencing means 240 for the activation of the elementary light sources and is configured to delay the activation of the elementary light source by a predetermined period following the reception of an activation command 12, which is preferably binary, typically generated by a control unit external to the matrix light source 200. The delay unit 230 is for example formed by an electronic circuit which forms a delay line.

Depending on the matrix light source, it may be voltage-driven or current-driven by a circuit for driving the supply of electric power. The control of a switch device 232 makes it possible to selectively supply electricity to the elementary light source 210. In the embodiment illustrated in FIG. 3, this control is carried out by the delay unit 230, which reproduces a delayed version of the control signal 12. The delay units 230 associated with different elementary light sources 210 of a group of rows are connected to each other, preferably in a chain as indicated by the arrows in FIG. 1, by an electrical connection 231. When the delay for an elementary light source (on the left) has elapsed, the delay unit 230 (on the left) controls the switch device 232 so as to supply electricity to the elementary light source 210 (on the left). At the same time, the delay unit 230 (on the left) transmits an "enable" trigger signal, for example a binary signal, to the homologous delay unit 230 (on the right) associated with the elementary light source 210 (on the right). Only upon receiving this "enable" signal from the delay unit (on the left) does the delay unit 230 (on the right) start counting down its predetermined delay. When the delay for the elementary light source (on the right) has elapsed, the delay unit 230 (on the right) controls the switch device 232 so as to supply electricity to the elementary light source 210 (on the right). Even if the two delay units are configured so as to implement a countdown of a similar duration, this means that the effective delays are different for the two elementary light sources, since the delays between connected delay units accumulate. For the delay unit 230 (on the right) in the given example, the effective delay is twice the effective delay of the delay unit 230 (on the left). The delay units are preferably clocked by a regular clock signal (not illustrated). Since the activation of the elementary light sources forming part of the chain that connects their respective delay units is delayed individually for each elementary light source, and since the separate groups of interlinked rows follow each other sequentially in the chain, this makes it possible to avoid a single maximum peak in the electricity consumption of the matrix light source 200 when the control signal 12 takes effect. The delay units of the elementary light sources are connected to each other and clocked by a common regular binary clock signal.

Other assemblies may be used to form the delay units without thereby departing from the scope of the present invention. For example, an alternative delay unit (not illustrated) may comprise a logic unit formed by a comparison circuit. The logic unit compares the activation control signal at the input of the light source with a status signal generated by a countdown unit. The status signal is for example zero when the delay has not yet elapsed, and the signal toggles to a non-zero value when the delay has elapsed. If both signals have a non-zero value, the resulting trigger signal is non-zero. It then relays the original control signal to the delay unit, in order to trigger the respective delay there. The countdown unit comprises for example a countdown circuit, configured to read the value of the delay to be counted down from a memory element or register of the integrated circuit. When the countdown has ended, the delay unit controls the device so as to supply electricity to the associated light source. Using a memory element to record the respective delay of each elementary light source allows increased flexibility. Different delays may be recorded for different elementary light sources, and the recorded values may be modified by write instructions to the respective memory elements over time. The effective delays for each light source obviously also depend on the frequency of the clock signal. It goes without saying that the integrated circuit may comprise additional electronic circuits. This may notably be a circuit performing diagnostic functions on the operation of the elementary light source.

Figure 4:
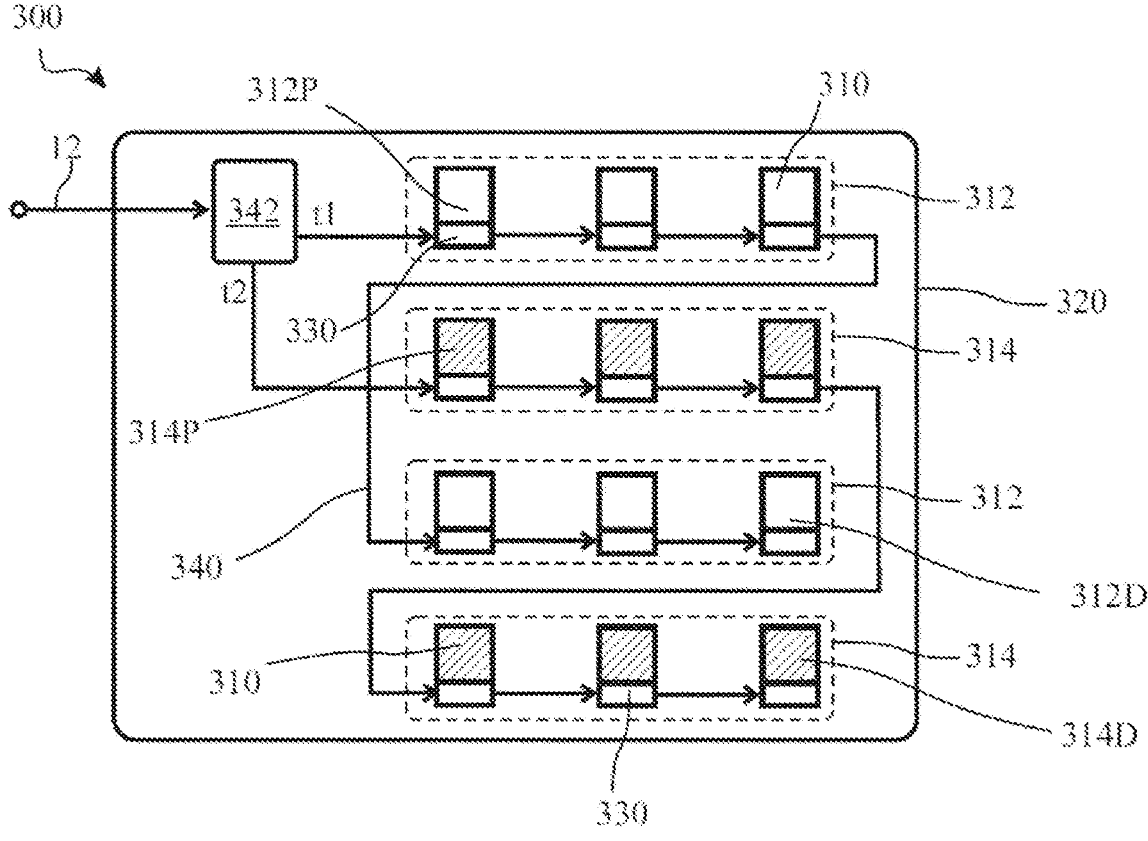
FIG. 4 schematically shows a matrix light source according to a preferred embodiment of the invention.

FIG. 4 shows another embodiment of a matrix light source 300 in accordance with a preferred embodiment of the invention. The integrated circuit 320 is preferably soldered to the lower face of the common substrate, which houses the elementary light sources, so as to establish mechanical and electrical contact with the substrate and the elementary light sources. The integrated circuit further comprises, for at least one, but preferably for all of the elementary light sources 310, a delay unit 330 configured to delay the activation of the elementary light source by a predetermined period following the reception of an activation command 12, typically generated by a control unit external to the matrix light source 300. The delay unit 330 associated with each of the elementary light sources 310 is illustrated purely schematically in FIG. 3. It may notably be formed according to one of the embodiments described in connection with FIGS. 2 and 3. The delay implemented for each of the elementary sources 310 preferably differs, in such a way that a control signal 12 intended at the same time for all of the elementary sources 310 of the matrix source 300 is subjected to a different delay for each elementary source, or at least for separate sets of elementary light sources. Since the activation of the elementary light sources is delayed potentially individually for each elementary light source, this makes it possible to avoid a single maximum peak in the electrical consumption of the matrix light source 300 when the control signal 12 takes effect.

Using an integrated circuit 320 in mechanical and electrical contact with the substrate on which the elementary light sources reside makes it possible to dispense with wired connections, the number of which would be at least equal to the number of pixels of the matrix light source.

The elementary light sources 310 are grouped into a number G of separate groups of rows interlinked in such a way that each set of G rows which follow each other in the matrix array comprises a row belonging to each of the G groups of rows respectively. G is an integer. In the non-limiting example in FIG. 4, G=2, the two groups of rows 312 and 314 being respectively indicated by non-hatched and hatched light sources. The integrated circuit 320 further comprises sequencing means 340, and notably a sequencing unit 342 that is preferably programmable by suitable software code, and configured to sequentially activate the elementary light sources which belong to a same given group of rows following the reception of an activation command, and to then sequentially activate the groups of rows. Following the reception of an activation command 12, firstly, at the time t1, the sequencing unit 342 is programmed to activate the first elementary light source 312P of the first group of rows 312. Then, following ideally identical delays, each of the elementary light sources of the first row of the matrix array are activated, one after the other. By using, in a non-limiting and purely exemplary manner, the chaining between the elementary light sources of the first group of rows 312 as indicated in the embodiment in FIG. 3, the sequencing unit does not need to intervene and waits until the last elementary source 312D has been activated, after a predetermined period has elapsed, which determines the time t2. Then, secondly, at the time t2, the sequencing unit 342 is programmed to activate the first elementary light source 314P of the second group of rows 314. Following ideally identical delays, each of the elementary light sources of the second row of the matrix array are activated, one after the other. By using, in a non-limiting and purely exemplary manner, the chaining between the elementary light sources of the second group of rows 314 as indicated in the embodiment in FIG. 3, the sequencing unit does not need to intervene and waits until the last elementary source 314D has been activated, after a predetermined period has elapsed. It goes without saying that this principle extends to configurations having three, four or more interlinked groups of rows. The programmable sequencing unit 342 allows increased flexibility in the composition of groups of rows: depending on the program and the chaining architecture used, the unit may change the number of groups of interlinked rows G, or control each of the elementary light sources of the matrix array individually, without chaining the respective delay units.

It is noted that, in the examples presented above, the matrix light source comprises elementary light sources which are aligned with each other vertically and horizontally, regardless of the group to which they belong.

Figure 5:
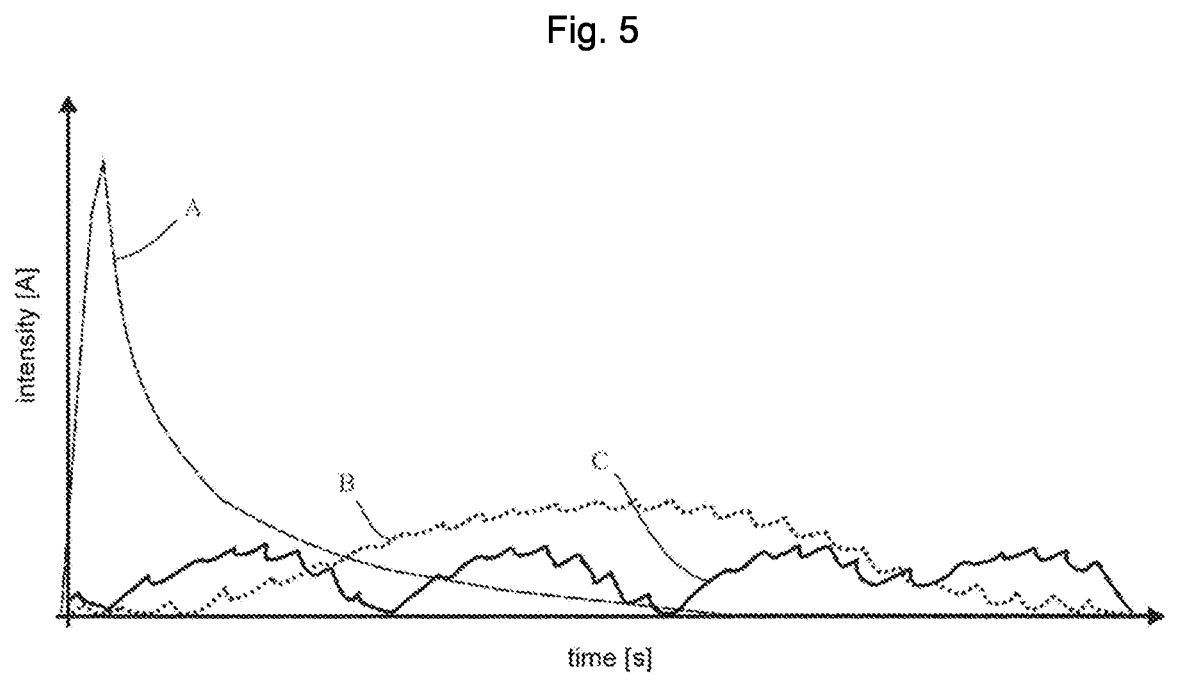

FIG. 5 compares measurements of the inrush current intensity of a matrix light source which projects the same image, or photometric image, in three different scenarios. It is notably a regulated photometric image of the high-beam light type for an automotive vehicle. Quantitatively equivalent results were observed for other photometric images, such as low-beam lights or a flat cutoff. In the first scenario, A, no activation delay is used: the inrush current exhibits a high intensity peak at the moment of the activation command for the matrix light source. In the second scenario, B, a uniform delay is sequentially applied by columns, then by rows which follow each other in the matrix array: this makes it possible to avoid the current peak in scenario A. In the third scenario, C, the device and the method according to the invention is used. A uniform delay is sequentially applied by columns, the rows of the matrix array are grouped into four interlinked groups. First of all, the rows of the first group are activated, followed by the rows of the second group, then of the third group and lastly of the fourth group. It is noted that the measures of the invention allow greater smoothing of the variation in the electric current intensity over time, and greater reduction in the maximum current intensity produced by the light source, compared with scenarios A and B.

The scope of the protection is defined by the claims.

What is claimed is:

1. A matrix light source comprising an integrated circuit and a matrix array of electroluminescent semiconductor element-based elementary light sources, wherein the integrated circuit is in contact with the matrix array and includes sequencing means for the activation of the elementary light sources, including, for each of the elementary light sources, a delay unit configured to delay the activation of the elementary source by a predetermined period, wherein the elementary light sources are grouped into a number G of separate groups of rows interlinked in such a way that each set of G rows which follow each other in the matrix array includes a row belonging to each of the G groups of rows respectively, and in that the sequencing means are configured to sequentially activate the elementary light sources forming part of a given group of rows following the reception of an activation command, and to sequentially activate the groups of rows.

2. The matrix light source as claimed in claim 1, wherein the sequencing means are configured to sequentially activate the elementary light sources of a given row, column by column.

3. The matrix light source as claimed in claim 1, wherein the sequencing means includes connections which functionally connect the delay unit of one elementary source to the delay unit of another elementary light source from the same group of rows, the arrangement being such that the delay for the second elementary light source starts to elapse only once the delay of the first elementary light source has elapsed.

4. The matrix light source as claimed in claim 3, wherein the delay unit of each elementary light source includes a trigger circuit for sending a trigger signal to the light source that is connected thereto, following the elapsing of its delay.

5. The matrix light source as claimed in claim 3, wherein the delay unit of a last elementary light source of one group of rows is functionally connected to the delay unit of a first elementary light source of another group of rows, which follows the first group of rows in the activation sequence.

6. The matrix light source as claimed in claim 1, wherein the sequencing means includes a sequencing unit which is functionally connected to at least each first elementary light source of each of the groups of rows and configured to selectively trigger the respective delay units of the first elementary light sources.

7. The matrix light source as claimed in claim 1, wherein the matrix array includes four groups of rows interlinked in such a way that each set of four rows which follow each other in the matrix array includes a row belonging to each of the four groups of rows.

8. The matrix light source as claimed in claim 1, wherein the delay for each elementary light source is identical and between 5 ns and 1 μs.

9. The light source as claimed in claim 1, wherein the delay unit includes a memory element for recording a delay value.

10. The light source as claimed in claim 1, wherein the number G of rows is a parameter that is recorded and can be modified in a memory element readable by the sequencing means.

11. The light source as claimed in claim 1, wherein all of the elementary light sources are aligned with each other regardless of the group of rows to which they belong.

12. The light source as claimed in claim 1, wherein the sequencing means includes a sequencing unit functionally connected to the delay unit of each of the elementary light sources so as to be able to selectively trigger the respective delay units of the elementary light sources.

13. A luminous module for an automotive vehicle, comprising at least one matrix light source and a circuit for driving the supply of electric power to the source, with the at least one matric light source including an integrated circuit and a matrix array of electroluminescent semiconductor element-based elementary light sources, wherein the integrated circuit is in contact with the matrix array and includes sequencing means for the activation of the elementary light sources, including, for each of the elementary light sources, a delay unit configured to delay the activation of the elementary source by a predetermined period, wherein the elementary light sources are grouped into a number G of separate groups of rows interlinked in such a way that each set of G rows which follow each other in the matrix array includes a row belonging to each of the G groups of rows respectively, and in that the sequencing means are configured to sequentially activate the elementary light sources forming part of a given group of rows following the reception of an activation command, and to sequentially activate the groups of rows.

14. The luminous module as claimed in claim 13, wherein the circuit for driving the supply of electric power includes switch devices, each switch device being associated with a corresponding elementary light source and being controlled by a corresponding delay unit.

15. A method for activating semiconductor element-based elementary light sources of a matrix light source, with the matric light source including an integrated circuit and a matrix array of electroluminescent semiconductor element-based elementary light sources, wherein the integrated circuit is in contact with the matrix array and includes sequencing means for the activation of the elementary light sources, including, for each of the elementary light sources, a delay unit configured to delay the activation of the elementary source by a predetermined period, wherein the elementary light sources are grouped into a number G of separate groups of rows interlinked in such a way that each set of G rows which follow each other in the matrix array includes a row belonging to each of the G groups of rows respectively, and in that the sequencing means are configured to sequentially activate the elementary light sources forming part of a given group of rows following the reception of an activation command, and to sequentially activate the groups of rows, following the reception of a signal for activating the matrix light source, the method comprising:

i—using the sequencing means and the delay units associated with the elementary light sources, sequentially activating the elementary light sources forming part of a given group of rows;

ii—sequentially activating the groups of rows; the elementary light sources of the matrix array being grouped into a number G of separate groups of rows interlinked in such a way that each set of G rows which follow each other in the matrix array comprises a row belonging to each of the G groups of rows respectively.

* * * * *